Figure 1:
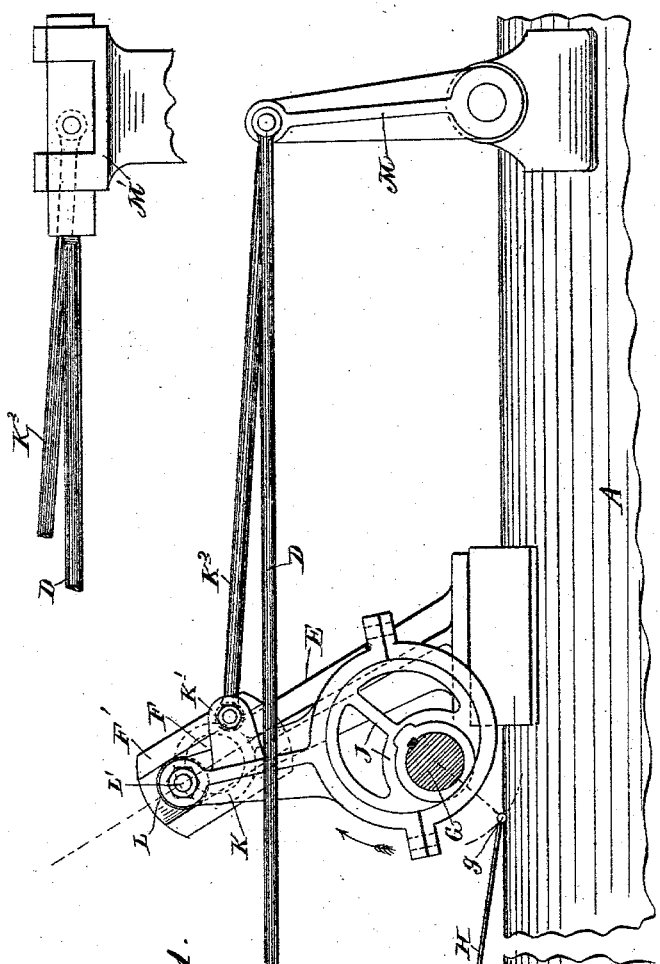

(No Model.) 5 Sheets—Sheet 1.

E. J. WOOLF & J. PEEBLES.
VALVE GEAR FOR ENGINES.

No. 455,872. Patented July 14, 1891.

Fig. II.

Witnesses.
A. H. Opsahl.
Frank D. Merchant.

Inventors
Ellis J. Woolf
John Peebles
By their Attorney.
Jas. F. Williamson

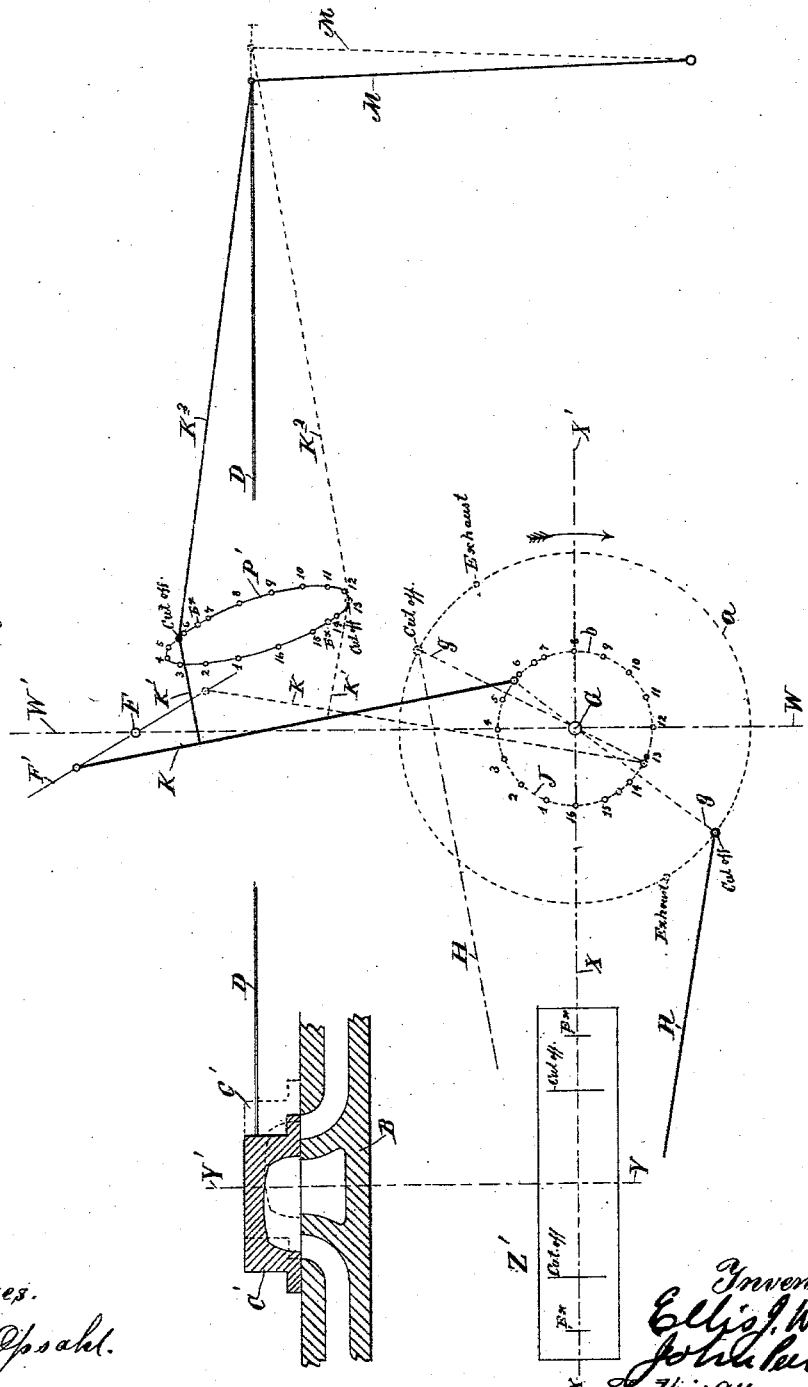

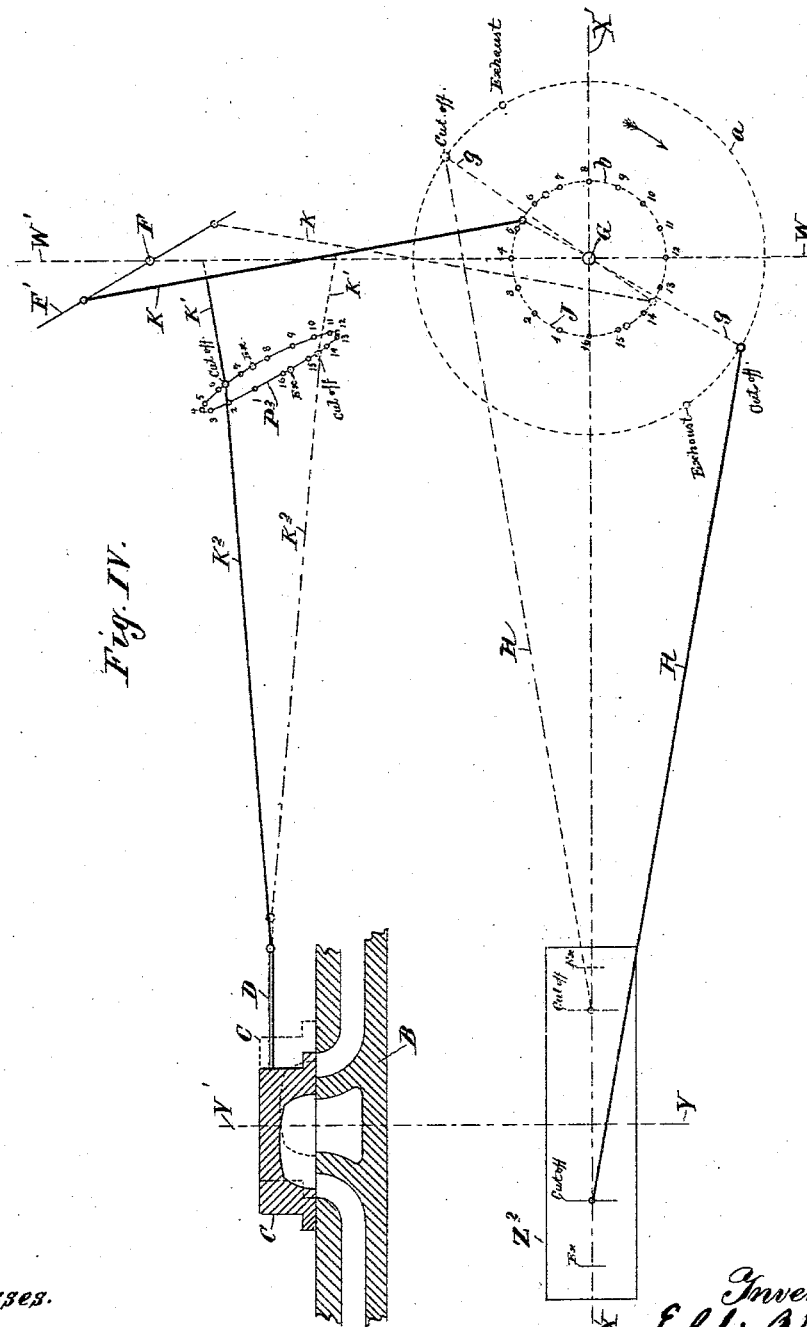

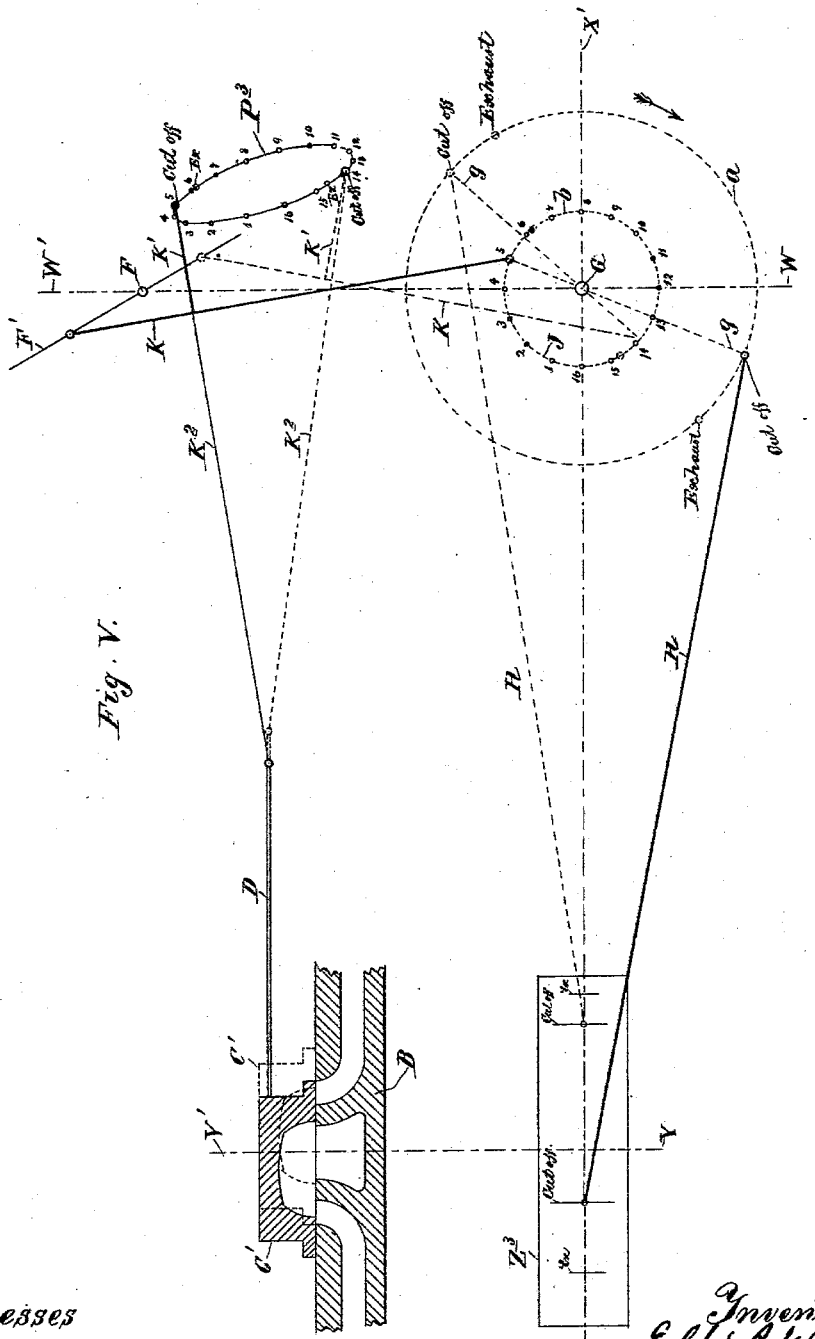

(No Model.)  5 Sheets—Sheet 5.
E. J. WOOLF & J. PEEBLES.
VALVE GEAR FOR ENGINES.
No. 455,872.  Patented July 14, 1891.
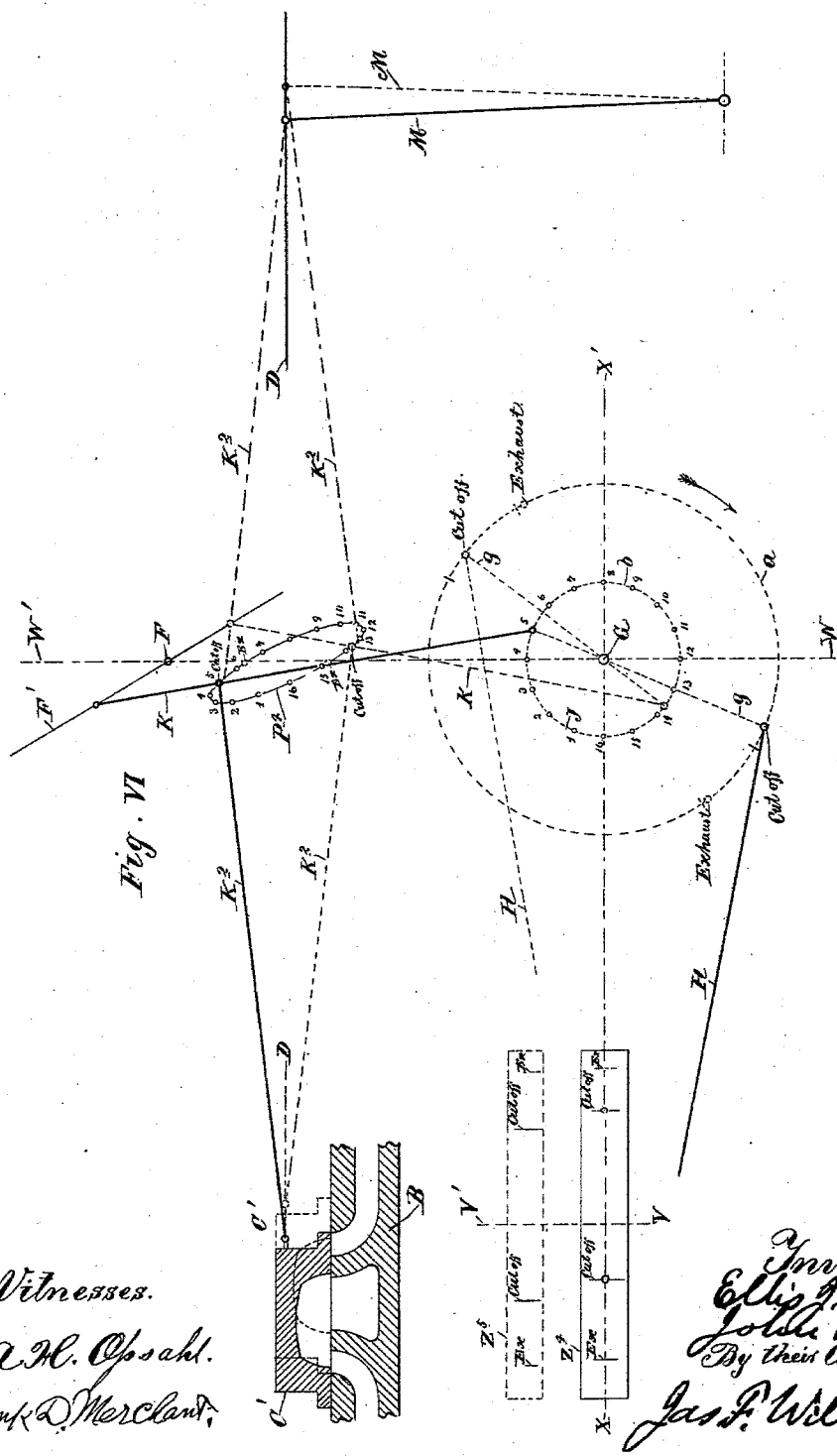
Witnesses.
A. H. Opsahl.
Frank D. Merchant.
Inventors
Ellis J. Woolf
John Peebles
By their Attorney.
Jas. F. Williamson

UNITED STATES PATENT OFFICE.

ELLIS J. WOOLF AND JOHN PEEBLES, OF MINNEAPOLIS, MINNESOTA, ASSIGNORS TO THE WOOLF VALVE GEAR COMPANY, OF SAME PLACE.

VALVE-GEAR FOR ENGINES.

SPECIFICATION forming part of Letters Patent No. 455,872, dated July 14, 1891.

Application filed December 13, 1890. Serial No. 374,544. (No model.)

*To all whom it may concern:*

Be it known that we, ELLIS J. WOOLF and JOHN PEEBLES, citizens of the United States, residing at Minneapolis, in the county of Hennepin and State of Minnesota, have invented certain new and useful Improvements in Valve-Gears for Engines; and we do hereby declare the following to be a full, clear, and exact description of the invention, such as will enable others skilled in the art to which it appertains to make and use the same.

Our invention relates especially to that class of valve-gears described in the United States Letters Patent issued to us of date July 30, 1889, numbered 407,806, and in the pending application of Ellis J. Woolf, under Serial No. 348,662, filed April 19, 1890, and allowed November 14, 1890. It was designed in order to get the best results on traction and some other forms of engines; but the improvement is also capable of general application to some other forms of valve-gear.

It has for its object to provide an additional means of further overcoming the obliquity of the main rod with a view of obtaining a more equal distribution of the steam. This is done by extending the eccentric-rod from the strap in the opposite direction to the main rod from the crank, thus reversing their angularities and obtaining necessary compensation.

In order to transfer the motion from the outer end of the eccentric-rod to the valve, a suitable transfer or directing device is provided adapted to support the outer ends of both the eccentric-rod and the valve-rod. This directing or transferring device may be either a straight-line guide or a pivoted rocker. If the eccentric be placed opposite the crank, the connection from the directing or transferring device to the valve must be direct. If, however, the eccentric be placed in line with the crank, the connection must be indirect, which can be readily effected by making the pivoted rocker a reversing-rocker or by making the transferring device in any other suitable form adapted to reverse the motion in its transmittal to the valve.

The invention and its operation are fully illustrated in the accompanying drawings therein, like notations referring to like parts throughout.

Figure I is a sectional elevation of our improved gear as applied to a traction-engine. Fig. II is a detail in side elevation, showing a modified form of the transferring device for the outer end of the eccentric-rod and valve-stem; and Figs. III, IV, V, VI are diagrams showing actual and comparative effects of the construction.

A represents a part of the boiler of a traction-engine.

B is the cylinder.

C is the valve-chest, C' the valve, and D is the valve-rod.

E is a bracket fixed to the boiler.

F is the rock-shaft journaled in the bracket and provided on one end with the guide F' for the outer end of the eccentric-strap.

G is the main shaft, $g$ the crank-pin, and H the main or connecting rod.

J is the eccentric.

K is the eccentric-strap provided with the offset point of attachment K' for the eccentric-rod $K^2$, this point of attachment being offset from the strap's center line of motion.

L is the roller movable in the strap-guide F', and L' the pin pivotally connecting the outer end of the strap to the roller. M and M' are two forms of the directing device for the outer end of the eccentric-rod and valve-rod, the one M being a pivoted rocker (shown as pivoted to the boiler) and having both rods pivotally connected to its outer end, and the other M' being a rigid straight-line guide in which the outer end of the valve-rod is free to reciprocate, the eccentric-rod in the latter case being pivotally connected to the valve-rod.

It will be seen that the offset point of attachment K' and the eccentric-rod $K^2$ extend in a direction from the strap opposite to the direction of the main rod from the crank, that the valve-rod is proportionately extended to meet this change, and that the directing device M or M' both supports and directs the outer ends of both the eccentric and the valve rods. The strap-guide F' may be shifted into different positions for varying the points of cut-off or reversing the engine, as may be desired, by rocking the shaft F', to which it is rigidly attached. It will of course be understood that this strap-guide instead of being a block with ways for directing the roller, as shown, could be a pivoted arm, such as is shown and described in the pending application above identified.

The operation is illustrated in the diagram Figs. III, IV, V, and VI, reference to which will now be made. It should be premised that in these diagrams the eccentric is set opposite the crank, and the arrangement of the co-operative parts is such in all as to give equal lead openings in both the forward and the backward motion of the engine. The diagrams are all drawn to the same scale and are symmetrical with each other. The valve is shown in full lines at the point of cut-off on the outstroke and in dotted lines on the instroke. Necessarily when the valve is midway between these two positions it is at the point of exhaust. The valve positions being constant or identical in all the diagrams, the resultant necessary positions of the other co-operative parts exhibit the effects of the constructions and afford a basis of comparison. In these diagrams the line W W' is a vertical line through the centers of the eccentric and crank shaft G and the rock or guide shaft F. The line X X' is the center line of the crank-shaft and cylinder, and the line Y Y' is the vertical line through the center of the cylinder. $Z'$, $Z^2$, $Z^3$, $Z^4$, and $Z^5$ are scale-plates on the respective diagrams representing the piston's stroke for exhibiting the points of cut-off and exhausts on the cylinder. The circle $a$ represents the path of the crank, and the circle $b$ the path of the eccentric. The curves $P'$, $P^2$, $P^3$, and $P^4$ represent the respective paths described by the eccentric-rod's pivotal point of attachment to the eccentric-strap in the different constructions. The curves are divided into corresponding divisions (marked consecutively from 1 to 16) for convenience in locating the positions of the operative parts. The operative parts are represented by full lines in their positions at the cut-off on the outstroke and by dotted lines in their position at the cut-off on the instroke. The point of cut-off and the exhausts are noted on the curves, and the scale-plate and the lead points on the curves $P'$ $P^2$, &c. With these explanations the diagrams will be readily understood. Fig. III may be called the "positive diagram," showing the effect of the gear in the form improved, as hereinbefore described and shown in Figs. I and II. By reference to its scale-plate $Z'$ it may be seen by the eye and verified by measurement that the cut-offs and the exhausts are practically identical for both strokes. Fig. IV may be termed the "contrast diagram," showing the effect of the gear without the improvements herein described. By reference to its scale-plate $Z^2$ it can be seen that while this gives fairly good results the cut-offs and exhausts are quite perceptibly different in the two strokes. The difference in results between the old and the new, as shown in Figs. III and IV, is one measure of the gain made by the improvements herein described. Fig. V may be called the "negative diagram," as it was simply intended to show that such a construction would not answer, even although the eccentric-rod be attached to the identical point used in Fig. III as long as it takes the same direction as the main rod. In other words, no improvement would be effected over the old constructions by simply placing the offset-point on the opposite side of the strap and running the eccentric-rod directly therefrom to the valve in the same direction as the main rod from its crank; but on the contrary, as it may be seen by reference to its scale-plate $Z^5$, the results would be much worse than in the old constructions. Fig. VI may be called the "center-line diagram," showing the effect of the improvement without the offset point of attachment. The scale-plate $Z^4$ shows the effects when the eccentric-rod is attached to the strap at a point in its center line of motion and extended directly to the valve in the same direction as the main rod, while the place $Z^5$ shows the effects when the rod, though still attached in the center line, is extended in the opposite direction from the main rod. The difference is very marked and affords another measure of the improvement. In other words, the change in the direction of the eccentric-rod with reference to the main rod is a marked improvement either with or without the offset point of attachment. Incidentally this diagram, Fig. VI, affords a basis of comparison by which to measure the gain due solely to the offset-point. A comparison of scales $Z^4$ and $Z^2$, Fig. IV, marks the gain when the eccentric-rod takes the same direction as the main rod, and a comparison of scales $Z^5$ and $Z'$, Fig. III, marks the gain due to the offset-point when the eccentric-rod is extended in the opposite direction from the main rod.

It is evident that it requires the combination of the offset-point and the eccentric-rod extended opposite to the main rod to give the best results, as is shown in Fig. III.

The diagrams show the results in only one position of the mechanism provided to reverse the engine and also to vary the points of cut-off in either motion of the engine. It might equally well be shown that a like improvement or gain in results is obtained in all other positions, as the fact has been demonstrated by engines in actual service; but this would require such a multiplication of diagrams that the same is not deemed necessary for the purposes of this application.

What we claim, and desire to secure by Letters Patent of the United States, is as follows:

1. In a valve-gear, the combination, with the crank and the main rod, of an eccentric, an eccentric-strap, and an eccentric-rod extending from the strap in a direction opposite from the main rod.

2. In a valve-gear, the combination, with the crank and the main rod, of an eccentric, an eccentric-strap, an eccentric-rod extending from the strap in a direction opposite from the main rod, and a directing device for supporting the outer ends of the eccentric-rod and the valve-rod and transferring the motion to the valve.

3. In a valve-gear, the combination, with the crank and the main rod, of an eccentric, an eccentric-strap, a guide for the outer end of the strap, and an eccentric-rod extending from the strap in a direction opposite to the main rod.

4. In a valve-gear, the combination, with the crank and the main rod, of an eccentric, an eccentric-strap, a guide for the outer end of the strap, an eccentric-rod extending from the strap in a direction opposite to the main rod, and a directing device for supporting the outer ends of the eccentric-rod and the valve-rod and transferring the motion to the valve.

5. In a valve-gear, the combination, with the crank and the main rod, of an eccentric, an eccentric-strap, a guide for the outer end of the strap, and an eccentric-rod connected to the strap at a point offset from the strap's center line of motion and extending in a direction opposite from the main rod, substantially as described.

6. In a valve-gear, the combination, with the crank and the main rod, of an eccentric, an eccentric-strap, a guide for the outer end of the strap, an eccentric-rod connected to the strap at a point offset from the strap's center line of motion and extending in a direction opposite from the main rod, and a directing device for supporting the outer end of the eccentric-rod and the valve-rod and transferring the motion to the valve, substantially as described.

7. In a valve-gear, the combination, with the crank and the main rod, of an eccentric, an eccentric-strap having a point of attachment for the eccentric-rod offset from the strap's center line of motion, and an eccentric-rod attached to said offset-point and extending in a direction opposite to the main rod.

In testimony whereof we affix our signatures in presence of two witnesses.

ELLIS J. WOOLF.
JOHN PEEBLES.

Witnesses:
JAS. F. WILLIAMSON,
EMMA F. ELMORE.